July 28, 1964     H. N. ALEXANDER     3,142,563
METHOD AND APPARATUS FOR FORMING FULL COLOR
VIEWING PHOTOGRAPHIC IMAGE
Filed Dec. 14, 1959

INVENTOR
HAROLD N. ALEXANDER
BY HIS ATTORNEYS
HARRIS, KIECH, RUSSELL & KERN

United States Patent Office 3,142,563
Patented July 28, 1964

3,142,563
METHOD AND APPARATUS FOR FORMING FULL
COLOR VIEWING PHOTOGRAPHIC IMAGE
Harold N. Alexander, 856 Sanborn Ave.,
Los Angeles 29, Calif.
Filed Dec. 14, 1959, Ser. No. 859,291
4 Claims. (Cl. 96—2)

This invention relates to the photographic art and, more particularly, to the formation from conventional photographic materials of a viewable image in full color.

In the photographic art it has long been conventional practice to form color separation negatives and positives in black and white on transparent base stock such as ordinary photographic film. Such negatives are usually made by making two or more identical photographic exposures of the same scene, each through a transparent light filter of a different color. The negatives are employed for a wide variety of photographic and printing purposes, as is well known in the art. Positives are made from such negatives in a conventional manner.

It is also old to form a viewable image in full color by simultaneously, and separately, projecting colored light through each of a pair of such separation positives, the light color of each corresponding to the color of the filter through which the negative therefor was originally made. For example, red and green filters may be used to make the original pair of color separation negatives, and in such projection red light is projected through the color separation positive corresponding to the red separation negative, and green light is projected through the color separation positive corresponding to the green separation negative. The images produced by such projection are superimposed in registry on a screen and the combined image appears in full color to the viewer. Such a system is described and illustrated in the May 1959 issue of "Scientific American" magazine. Such system requires expensive projection equipment, which is undesirable, and the correct registration of superimposed projected images is difficult to attain.

It is a primary object of my invention to form a viewable image in full color without the use of projection, to obviate the disadvantages of such projection, and to form such an image utilizing conventional paper positive prints made from conventional color separation negatives. In accomplishing this, I make a pair of such color separation positive prints on paper, one corresponding to that made from a color separation negative made with a first color filter, such as red, and the other corresponding to that made from a color separation negative made with a second color filter, such as green. I then superimpose the paper prints in registry, projecting through both prints light of a color, i.e., wavelength, corresponding generally to the filter color or wavelength of the back print, and simultaneously shining on the face of the front print light of a color, i.e., wavelength corresponding to the filter color or wavelength of the front print. This provides a viewable image in full color when viewed from in front of the front print. Various modifications of this basic method are pointed out hereinafter.

A further object of the invention is to provide an apparatus for practicing said method to produce a viewable image in full color.

Other objects and advantages will appear from the following specification and the drawing, which is for the purpose of illustration only, and in which.

Figure 1:
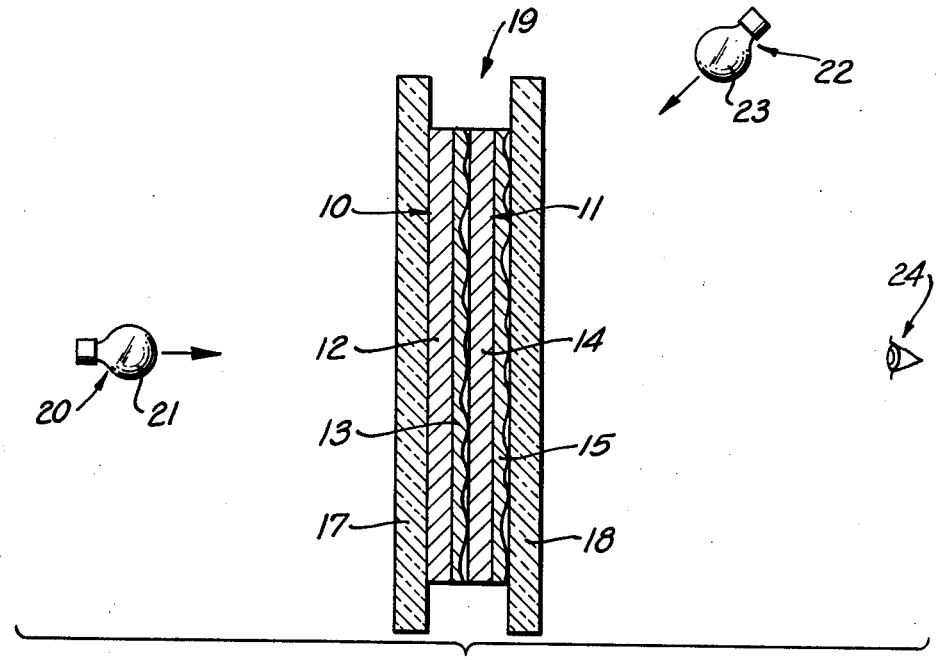
FIG. 1 is a diagrammatic view illustrating the principles of the invention.

Referring to FIG. 1, there is diagrammatically illustrated a back positive photographic print 10 having superimposed thereon a front positive photographic print 11. The back print 10 has a conventional paper backing 12 and a conventional black and white emulsion 13 thereon. Similarly, the print 11 has a conventional paper backing 14 and a conventional black and white emulsion 15 thereon. The paper backings 12 and 14 are preferably white in color, although backings of neutral grays may be employed, but with poorer results.

The back print 10 may be made directly from a conventional black and white color separation negative recorded through a filter of one color, such as green. It can also be made directly by contact or projection from a reversed full color negative, such as "Kodacolor," the print being made through a transparent color filter, such as green. Similarly, the front print 11 may be made directly from a conventional black and white color separation negative recorded through a filter of a second color, such as red, of the same scene. The front print 11 can also be made directly from the same reversed full color negative through a transparent color filter of the second color, such as red. As will appear hereinafter, the use of positive paper prints made directly from such a reversed full color negative is a further object of the invention.

The paper prints 10 and 11 are preferably held in superimposed registry by a pair of transparent plates 17 and 18, preferably formed of glass or plastic material, forming a "sandwich" 19.

Behind the sandwich 19 is a back light source 20, which, for the purpose of illustration, may be a conventional incandescent lamp 21. Such back light source 20 is adapted to emit light of a color substantially corresponding to the color of the filter through which the back print 10 or its color separation negative has been made. For example, if the back print 10 or its corresponding color separation negative has been made through a green filter, the light source 20 is designed to emit green light of a wave length generally corresponding. Instead of using a conventional green lamp as the light source 20, a white light lamp may be employed and a transparent green filter interposed between the light source and the back print 10, or a transparent green filter may be used for the back plate 17, or such a green filter may simply be interposed between the light source 20 and the sandwich 19.

In front of the sandwich 19 is provided a front light source 22, which, for the purpose of illustration, may consist of a conventional incandescent lamp 23, adapted to shine on the front of the sandwich 19 light of a color substantially corresponding to the color of the filter through which the front print 11 or its color separation negative has been made. For example, if the front print 11 or its corresponding color separation negative has been made through a red filter, the light source 22 is designed to emit red light of a wave length generally corresponding.

The back light source 20 is adapted to transmit light of the first color through the sandwich 19 from back to front thereof and towards a viewer at a location in front of the sandwich, such as the location 24. The front light source 22 is adapted to transmit light of the second color onto the front of the front print 11, such light, in whole or in part, passing through the emulsion 15 of the front print, and being reflected from the front face of the backing 14, and towards the viewer at location 24.

With such system in operation, a viewer at location 24 sees an image in full color appearing to correspond to the original scene from which the black and white paper prints 10 and 11 were made. This color image may be photographed and permanently recorded by any conventional color photography. In other words, the full color image seen by the viewer is not an optical illusion but may be recorded by conventional color photography. The colored image so seen by the viewer will not correspond exactly in its colors to the original scene photographed due to imperfections in the intervening photographic and viewing processes, but will be a close approximation.

The prints 10 and 11 may be reversed in position, putting the print 10 in the front and the print 11 in the back, if the light sources are also reversed. This will provide a similar colored image viewable from location 24, but the image will not be as pleasing to the human eye as it will tend towards the green end of the spectrum, whereas with the elements reversed, as originally described above, the image will tend towards the red end of the spectrum which is more pleasing to the eye.

Using a front print 11 made through a red filter or from a separation negative made through a red filter, and positioned as shown in FIG. 1, various substitutions may be made for the back print 10. For example, for the back print 10 may be substituted a black and white print made through, or whose separation negative was made through, either a blue or a yellow filter, but, if such substitution is made, a substitution must be made in the back light source 20 to provide light of a color corresponding to the color of the filter utilized in making the back print. Such substitutions will also produce an image in color viewable from location 24. Such a combination using a yellow back light source will produce a viewable image substantially as good as that using the green back light source. However, such a combination using a blue back light source will be much inferior to either.

I have found that, if conventional positive color separation transparencies, on glass or film, are substituted for my paper prints 10 and 11, no viewable full color image will be produced. I have also found that, if a green filter is interposed between the prints 10 and 11 and a white light source 20 is employed, no viewable full color image will be produced.

Since the light transmitted from the back light source 20 must pass through both prints 10 and 11, whereas the light transmitted from the front light source 22 must pass only through the emulsion 15 of the front print 11, the back light source 20 must be somewhat stronger than the front light source 22, assuming the light sources are substantially equidistant from the sandwich 19. In an experimental viewer utilizing my invention, I have found that the back light source 20 may be a green incandescent lamp having a wattage rating of 40 watts and the front light source 22 may be a red incandescent lamp having a wattage rating of 25 watts, when using prints 10 and 11 made on standard single-weight photographic paper. If such prints are made on photographic paper having a thicker or thinner paper backing, the relationship between the strengths of the light sources will vary, a stronger back light source being required for thicker paper backing and a weaker back light source being required for thinner paper backing. However, the paper backing for the front print 11 should not be much thinner than that used in standard single-weight photographic paper so that there will be no reduction of its ability to reflect light from the front light source 22 to a point at which a satisfactory viewable image is formed.

Figure 2:
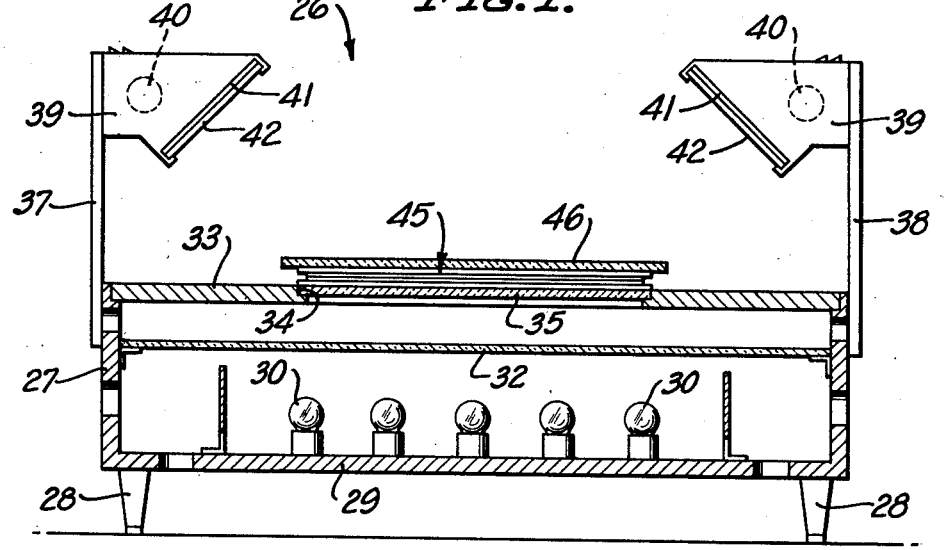
FIG. 2 is a vertical sectional view of an apparatus embodying my invention.

FIG. 2 of the drawing shows a simple viewer 26 of the invention, which includes a box 27 supported on suitable feet 28. The box 27 has a bottom shelf 29 supporting a plurality of incandescent lamps 30 which preferably have clear or frosted envelopes to produce white light. Above the lamps 30 is provided a transparent green filter 32 disposed horizontally. The box 27 has an opaque top 33 provided with a central opening 34 in which is inset a sheet 35 of conventional translucent opal or ground glass. The lamps 30 are provided in a pattern adapted to provide a substantially uniform illumination through the sheet 35, as is well known in the art.

Extending upwardly from the upper corners of the box 27 are two pairs of identical standards 37 and 38, each supporting a lamp housing 39. Each lamp housing 39 is provided with a plurality of incandescent lamps 40, a transparent red filter 41 and a sheet 42 of conventional opal or ground glass, the lamp housings being disposed so that a substantially uniform field of red light will be projected downwardly onto the sheet 35 in the top of the box 27.

All of the lamps 40 are wired in parallel and controlled by a suitable on-off switch and voltage regulator, such as a rheostat (not shown), as is well understood in the art. Similarlay, all of the lamps 30 are wired in parallel and controlled by a separate on-off switch and separate voltage regulator, such as a rheostat (not shown). The bank of lamps 30 forms a first light source and the banks of lamps 40 form a second light source.

In operation a sandwich 45, similar to the sandwich 19, is placed on the sheet 35 with the paper print corresponding to the red filter superimposed in registry on the paper print corresponding to the green filter. A sheet 46 of transparent glass is then placed on the sandwich 45 to hold the sandwich flat and the prints thereof in registry. The banks of lamps 30 and 40 are then actuated to produce an image in full color which may be viewed by an observer from above the box 27, in the same manner as described above with regard to FIG. 1.

The present invention has a number of important advantages over prior art processes of forming a viewable image in color. This invention utilizes conventional black and white photographic printing papers which are inexpensive compared with transparent film and glass based stock. Such black and white paper prints may be quickly made and immediately viewed even when wet. Such paper prints may be superimposed in perfect registry without difficulty, whereas in projection systems it is expensive and difficult to attain perfect registry of the projected images.

Being able to separately control the intensity of the light source is an important feature of my invention. Due to the inaccuracies of color photography and color separation negatives made thereby, it is practically impossible to obtain a satisfactory color print without correcting the density of one or more of the separation negatives. This is particularly true of color separation negatives to be used in making printing plates for multiple color printing with ordinary inks. Such corrections are time-consuming and expensive. It normally takes several hours to make a full color print from color film, whether of the positive or negative variety, and then it may be necessary to repeat the job to introduce density corrections required to produce a satisfactory color print. With my invention, by merely adjusting the relative intensities of the two light sources, the colors produced may readily be balanced as desired, to produce a satisfactory viewable image in color, thus producing such an image in minutes, as compared with the several hours required to make a satisfactory color print for viewing.

Also, my invention provides a simple means whereby the necessary corrections may be made in the color printing plates to be used in conventional printing processes. Thus, starting with red, green, and blue color separation negatives, as is usual in such processes, I make positive prints on photographic paper from the red and green separation negatives. These are then formed into a sandwich, such as the sandwich 19 or 45, and are placed in the viewer of my invention. If to obtain a satisfactory viewable image in color it is necessary to reduce the voltage on the green light source, say, by 10%, then this can be readily translated into a change in exposure values employed for making the final half-tone printing plates so as to provide a satisfactory color balance in the resulting printed color reproduction.

As pointed out above, a particular advantage of my method is the speed with which a viewable image in color can be created from a conventional reversed color negative, such as one made on standard "Kodacolor" sold by Eastman Kodak Company. From such a reversed color negative, positive black and white color separation prints on paper may be made by my method in only a few minutes, and such prints may be placed in a viewer as described above, even when wet, and illuminated to produce a viewable colored image. Such positive prints may, of course, be made by the conventional enlargement process to provide a viewable image in color substantially larger than the original reversed color negative. Also, such positive prints may be electrically or electronically transmitted to a distant point by ordinary communication techniques, where they may be assembled and viewed as a colored image within minutes at the distant point.

Other uses and advantages of my invention will occur to those skilled in the art. Also, I do not desire to be limited to the specific embodiments described hereinabove, but desire to be afforded the full scope of the following claims.

I claim as my invention:

1. A method of forming a viewable image in color, including the steps of:
   (a) making a first photographic print in black and white on the emulsion face of a photographic printing paper, said first print corresponding substantially to one made from a black and white color separation negative made of a colored scene through a filter transparent to light of a first wavelength;
   (b) making a second photographic print in black and white on the emulsion face of a photographic printing paper, said second print corresponding substantially to one made from a black and white color separation negative made of the same scene through a filter transparent to light of a second wavelength, said first and second wavelengths being substantially separated in the visible light spectrum;
   (c) superimposing said prints in registry and in contact, the faces of said prints facing in the same direction, said first print being behind said second print;
   (d) transmitting light of one wavelength through said first print and then through said second print, said one wavelength being closer to said first wavelength than to said second wavelength; and
   (e) simultaneously flooding the face of said second print with light of another wavelength, said other wavelength being closer to said second wavelength than to said first wavelength, to produce a viewable image in color.

2. A method of forming a viewable image in color, including the steps of:
   (a) making a first photographic print in black and white on the emulsion face of a photographic printing paper, said first print corresponding substantially to one made from a black and white color separation negative made of a colored scene through a filter transparent to light of a first wavelength;
   (b) making a second photographic print in black and white on the emulsion face of a photographic printing paper, said second print corresponding substantially to one made from a black and white color separation negative made of the same scene through a filter transparent to light of a second wavelength, said first and second wavelengths being substantially separated in the visible light spectrum;
   (c) superimposing said prints in registry and in contact, the faces of said prints facing in the same direction, said first print being behind said second print;
   (d) transmitting light of one wavelength through said first print and then through said second print, said one wavelength being closer to said first wavelength than to said second wavelength;
   (e) simultaneously flooding the face of said second print with light of another wavelength, said other wavelength being closer to said second wavelength than to said first wavelength, to produce a viewable image in color; and
   (f) adjusting the relative intensities of the light transmitted through said first and second prints and the light flooding the face of said second print to vary the color balance in said image.

3. A method of forming a viewable image in color, including the steps of:
   (a) making a first photographic print in black and white on the emulsion face of a photographic printing paper, said first print corresponding substantially to one made from a black and white color separation negative made of a colored scene through a filter transparent to light of a first wavelength;
   (b) making a second photographic print in black and white on the emulsion face of a photographic printing paper, said second print corresponding substantially to one made from a black and white color separation negative made of the same scene through a filter transparent to light of a second wavelength, said first and second wavelengths being in the green and red regions, respectively, of the visible light spectrum;
   (c) superimposing said prints in registry and in contact, the faces of said prints facing in the same direction, said first print being behind said second print;
   (d) transmitting light of one wavelength through said first print and then through said second print, said one wavelength being closer to said first wavelength than to said second wavelength; and
   (e) simultaneously flooding the face of said second print with light of another wavelength, said other wavelength being closer to said second wavelength than to said first wavelength, to produce a viewable image in color.

4. A method of forming a viewable image in color, including the steps of:
   (a) superimposing in registry and in contact first and second positive black and white photographic prints having paper bases, said prints being of the same colored subject, said first print being similar to a black and white positive print made from a black and white photographic negative made of the subject through a filter transparent to light of a first wavelength, and said second print being similar to a similar print made from a similar negative made of the subject through a filter transparent to light of a second wavelength;
   (b) transmitting light of one wavelength through said first print and then through said second print; and
   (c) simultaneously flooding the face of said second print with light of another wavelength, to form a viewable image in color on said face.

References Cited in the file of this patent

UNITED STATES PATENTS

| | | |
|---|---|---|
| 1,196,080 | Capstaff | Aug. 29, 1916 |
| 2,100,224 | Snyder et al. | Nov. 23, 1937 |
| 2,594,390 | Brumberger | Apr. 29, 1952 |
| 2,602,366 | De Liso | July 8, 1952 |
| 2,625,852 | Van Orden | Jan. 20, 1953 |

OTHER REFERENCES

Bello: "An Astonishing New Theory of Color," Fortune, May 1959, pp. 144–148, 195, 196, 200, 202, 205 and 206.

Land: "Experiments in Color Vision," Scientific American, May 1959, pp. 84, 87–94, 96 and 99.

"Brain Creates Colors, Test Shows," Washington Post, Apr. 29, 1958, p. A–9.

Cornwell-Clyne: "Colour Cinematography," pp. 261, 264 and 268, Chapman & Hall, 37 Essex St., London (1951).